(12) United States Patent
Mansouri et al.

(10) Patent No.: US 12,503,236 B2
(45) Date of Patent: Dec. 23, 2025

(54) CONCENTRIC ARMREST PIVOT

(71) Applicant: Safran Seats USA LLC, Gainesville, TX (US)

(72) Inventors: Reza Mansouri, Santa Fe Springs, CA (US); Amen Omoragbon, Westminster, CA (US)

(73) Assignee: Safran Seats USA LLC, Gainesville, TX (US)

( * ) Notice: Subject to any disclaimer, the term of this patent is extended or adjusted under 35 U.S.C. 154(b) by 172 days.

(21) Appl. No.: 17/837,621

(22) Filed: Jun. 10, 2022

(65) Prior Publication Data
US 2023/0399109 A1 Dec. 14, 2023

(51) Int. Cl.
*B64D 11/06* (2006.01)
*B60N 2/75* (2018.01)

(52) U.S. Cl.
CPC .......... *B64D 11/0644* (2014.12); *B60N 2/753* (2018.02); *B60N 2/767* (2018.02)

(58) Field of Classification Search
CPC ..... B60N 2/753; B60N 2/767; B64D 11/0644
See application file for complete search history.

(56) References Cited

U.S. PATENT DOCUMENTS

| | | | | |
|---|---|---|---|---|
| 3,397,912 A * | 8/1968 | Bush | ...................... | A47C 1/027 |
| | | | | 297/354.12 |
| 5,342,115 A | 8/1994 | De | | |
| 5,409,297 A | 4/1995 | De | | |
| 6,203,101 B1 * | 3/2001 | Chou | ...................... | A47C 7/543 |
| | | | | 297/411.32 |
| 6,375,265 B1 | 4/2002 | Hubner et al. | | |
| 6,652,032 B2 * | 11/2003 | Laval | ...................... | B60N 2/753 |
| | | | | 297/411.32 |
| 6,698,838 B2 * | 3/2004 | Kain | ...................... | A47C 7/543 |
| | | | | 297/250.1 |
| 6,755,474 B2 * | 6/2004 | Magnuson | ......... | B64D 11/0644 |
| | | | | 297/411.38 |
| 7,857,393 B2 * | 12/2010 | Cebula | ................... | B60N 2/767 |
| | | | | 297/411.32 |
| 8,931,847 B2 * | 1/2015 | Cailleteau | .......... | B64D 11/0644 |
| | | | | 297/411.3 |

(Continued)

FOREIGN PATENT DOCUMENTS

| | | |
|---|---|---|
| DE | 19704469 C2 | 5/2003 |
| DE | 102007031436 A1 | 1/2009 |

OTHER PUBLICATIONS

Europe Appl. No. 23171698.6, Office Action, Dec. 18, 2023, 12 pages.

*Primary Examiner* — Philip F Gabler
(74) *Attorney, Agent, or Firm* — Kilpatrick Townsend & Stockton LLP (57) ABSTRACT

An armrest pivot assembly may be provided for a passenger seat. An armrest pivot assembly includes an armrest support defining an aperture having an aperture wall. The aperture wall includes a first pivot-limiting feature. The armrest pivot assembly also includes an armrest pivot within the aperture of the armrest support and rotatable within the aperture relative to the armrest support. The armrest pivot includes a perimeter wall having a second pivot-limiting feature, and the first pivot-limiting feature and the second pivot-limiting feature define a range of rotation of the armrest pivot relative to the armrest support.

17 Claims, 6 Drawing Sheets

(56) References Cited

U.S. PATENT DOCUMENTS

| | | | | |
|---|---|---|---|---|
| 9,821,691 | B2* | 11/2017 | Brockman | B60N 2/943 |
| 10,681,982 | B2* | 6/2020 | Paul | A61G 5/14 |
| 10,814,762 | B2* | 10/2020 | Faccin | B60N 2/753 |
| 10,850,850 | B2* | 12/2020 | Murnan | B60N 2/767 |
| 11,492,123 | B2* | 11/2022 | Jacob | B60N 2/34 |
| 2007/0007810 | A1 | 1/2007 | Wu | |

* cited by examiner

CONCENTRIC ARMREST PIVOT

FIELD OF THE INVENTION

The field of the invention relates to passenger seats for passenger vehicles such as aircraft, and more particularly to passenger seats with armrest pivots.

BACKGROUND

Passenger seats, such as those provided on aircraft, trains, vehicles, and the like, sometimes include armrests for use by a user. Some armrests may be pivotable relative to a frame component passenger seat between a stowed (e.g., generally vertical) position and a deployed (e.g., generally horizontal) position such that the user may stow or deploy the armrests for use as desired. To limit armrest movement, conventional armrests have use a two pin arrangement where a pivot pin in an aperture defines an axis of rotation of the armrest and a separate guide pin in a guide slot provides a range of pivoting of the armrest. U.S. Pat. No. 10,850,850 to Murnan et al. ("Murnan") illustrates an example of such a conventional armrest. See, e.g., FIGS. 3A, 3B, and 9A of Murnan. Conventional armrests with guide slots and guide pins as shown in Murnan limit potential modularity of armrests and require a relatively large area for the armrest to attach to a frame, are relatively complex and difficult to install, and add weight to the overall passenger seat.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, an armrest pivot assembly for a passenger seat includes an armrest support and an armrest pivot. The armrest support defines an aperture having an aperture wall, and the aperture wall includes a first pivot-limiting feature. The armrest pivot is provided within the aperture of the armrest support and is rotatable within the aperture relative to the armrest support. The armrest pivot includes a perimeter wall with a second pivot-limiting feature, and the first pivot-limiting feature and the second pivot-limiting feature define a range of rotation of the armrest pivot relative to the armrest support.

In some embodiments, the first pivot-limiting feature includes a ridge extending inwards from the aperture wall, and the second pivot-limiting feature of the armrest pivot includes a recessed surface recessed into the armrest pivot relative to the perimeter wall.

In various embodiments, the ridge is elongated and includes a first end and a second end within the aperture, and the recessed surface is elongated and includes a first end and a second end.

In certain embodiments, the first end of the ridge is configured to engage the first end of the recessed surface when the armrest pivot is at first angular position, and the second end of the ridge is configured to engage the second end of the recessed surface when the armrest pivot is at a second angular position.

In various aspects, a length of the ridge is less than a length of the recessed surface.

In various embodiments, the recessed surface comprises a non-linear curvature, and wherein the ridge comprises an innermost surface comprising a non-linear curvature.

In some embodiments, the armrest pivot is rotatable between a first angular position and a second angular position. The first pivot-limiting feature may optionally may include an angle adjuster configured to adjust at least one of the first angular position or the second angular position. In certain embodiments, the angle adjuster may be a set screw or any other device or mechanism suitable for adjusting the first angular position or the second angular position as desired.

The armrest pivot may include at least one support location for an armrest.

Optionally, the armrest pivot assembly includes a friction device within the aperture between the perimeter wall of the armrest pivot and the aperture wall of the aperture.

In certain embodiments, the armrest pivot includes a locking mechanism configured to lock the armrest pivot at an angular position relative to the armrest support.

In various embodiments, a thickness of a portion of the armrest support defining the aperture is a same as a thickness of the armrest pivot.

In certain embodiments, the armrest pivot includes a first end and a second end, the perimeter wall extends from the first end to the second end, and the second pivot-limiting feature includes a recessed surface that is recessed relative to the perimeter wall and extends from the first end to the second end.

A passenger seat may include an armrest pivot assembly described herein and an armrest coupled to the armrest pivot.

In some embodiments, the armrest includes an end, and the end include a first extension and a second extension where the first extension and the second extension overlap the aperture and armrest pivot of the armrest pivot assembly.

In various cases, the passenger seat includes a first friction device between the first extension of the armrest and the armrest pivot assembly and a second friction device between the second extension of the armrest and the armrest pivot assembly.

According to certain embodiments of the present invention, an armrest pivot for a passenger seat includes a first end, a second end, and a perimeter wall between the first end and the second end. The perimeter wall extends from the first end to the second end. In certain embodiments, a portion of the perimeter wall between the first end and the second end includes a pivot-limiting feature configured to engage a complimentary pivot-limiting feature within an aperture of an armrest support.

In some embodiments, an armrest assembly includes the armrest pivot and the armrest support having the aperture with the complimentary pivot-limiting feature. The armrest pivot may be positioned within the aperture and rotatable relative to the armrest support.

In various embodiments, the armrest assembly further includes an armrest with a first extension and a second extension. The first extension may be coupled to the first end of the armrest pivot and the second extension may be coupled to the second end of the armrest pivot.

According to certain embodiments of the present invention, an armrest pivot assembly includes an armrest support having an aperture and a first pivot-limiting feature within the aperture. The armrest pivot assembly also includes an armrest pivot within the aperture of the armrest support and rotatable within the aperture relative to the armrest support. The armrest pivot may include a second pivot-limiting feature within the aperture defined by the armrest support, and the second pivot-limiting feature may be configured to selectively engage the first pivot-limiting feature.

In various embodiments, the second pivot-limiting feature is configured to engage the first pivot-limiting feature when the armrest pivot is rotated to a first angular position or a second angular position relative to the armrest support, and the armrest pivot assembly includes an angle adjuster at least partially within the aperture and configured to adjust at least one of the first angular position or the second angular position.

DETAILED DESCRIPTION

The described embodiments of the invention provide armrest pivot assemblies for passenger seats. While the armrest pivot assemblies are discussed for use with aircraft seats, they are by no means so limited. Rather, embodiments of the armrest pivot assemblies provided herein may be used in passenger seats or other seats of any type or otherwise as desired.

According to certain embodiments of the present invention, as shown in FIGS. 1-13, an armrest assembly 100 for a passenger seat includes an armrest pivot assembly 102 and an armrest 104. A passenger seat including such an armrest assembly 100 may be various types of passenger seats as desired, including but not limited to an aircraft passenger seat. In one non-limiting example, an economy class aircraft passenger seat may incorporate the armrest assembly 100, although other classes of aircraft passenger seat may incorporate the armrest assembly 100 in other embodiments.

Figure 1:
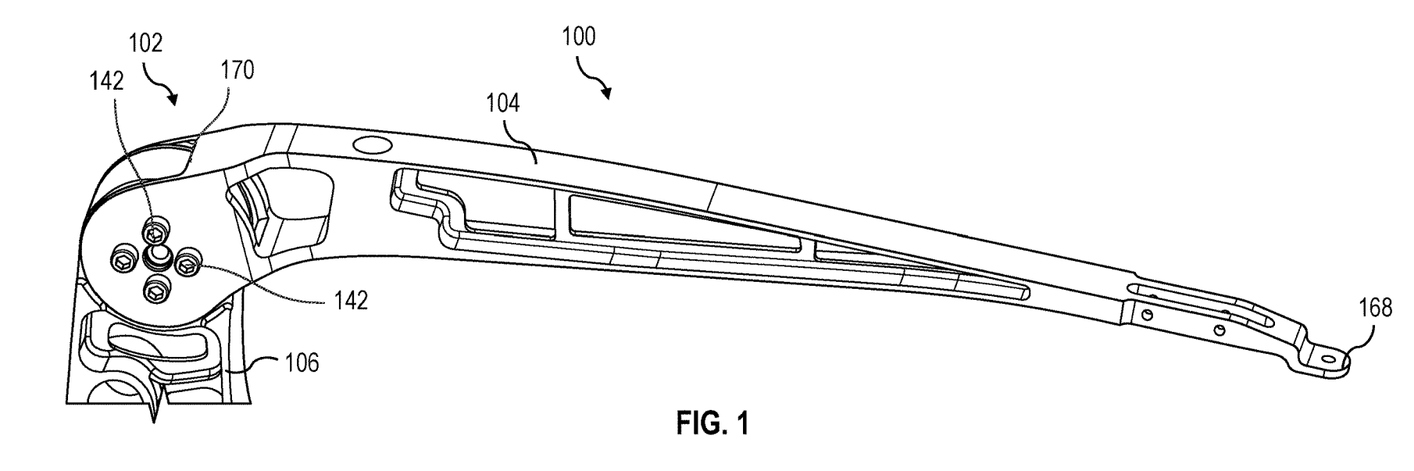
FIG. 1 is a perspective view of an armrest assembly for a passenger seat with an armrest and an armrest pivot assembly according to embodiments.
Figure 2:
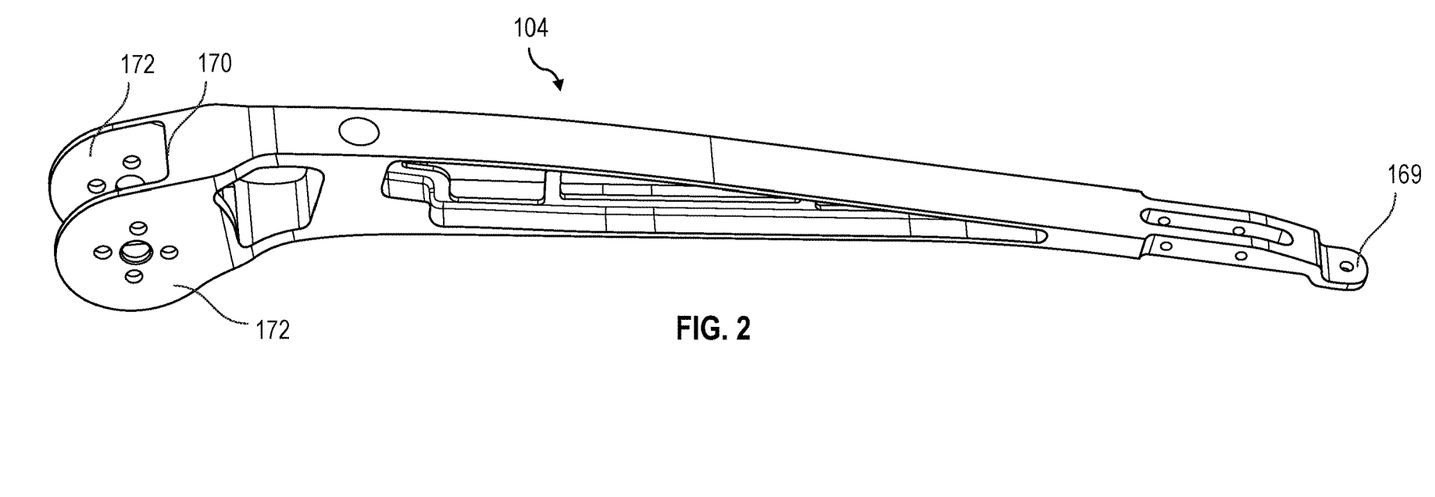
FIG. 2 is a perspective view of the armrest of FIG. 1.

Referring to FIG. 2, the armrest 104 generally includes a first end 168 and a second end 170. The second end 170 may include one or more extensions 172. In the embodiment illustrated, the second end 170 includes two extensions 172. The armrest 104 illustrated should not be considered limiting, as in other embodiments, the armrest 104 may be various types of armrests as desired.

The armrest pivot assembly 102 includes an armrest support 106 and an armrest pivot 108. As discussed in detail below, the armrest pivot 108 may both attach or be coupled to the armrest 104 while controlling pivoting or rotation of the armrest 104, thereby providing an armrest pivot with concentric features compared to traditional armrest assemblies.

Figure 3:
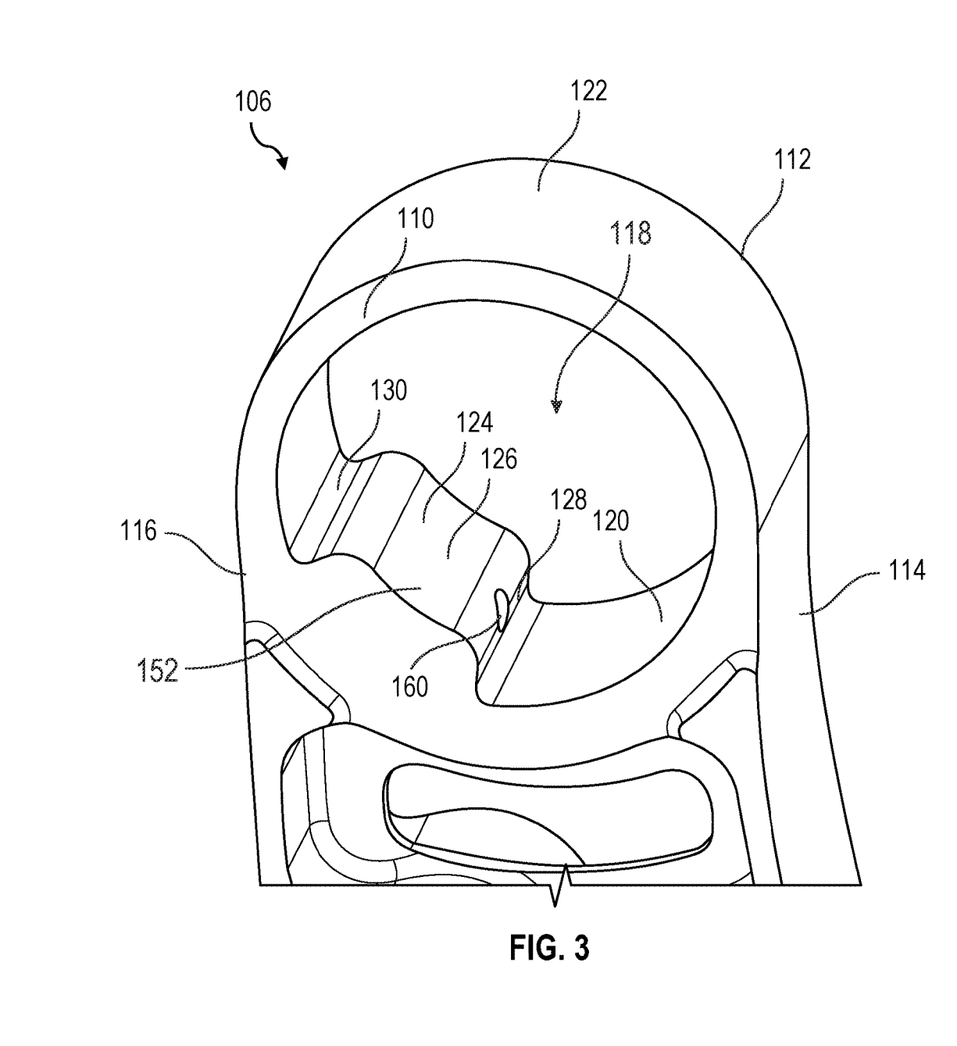
FIG. 3 is a perspective view of a portion of an armrest support of the armrest assembly of FIG. 1.
Figure 4:
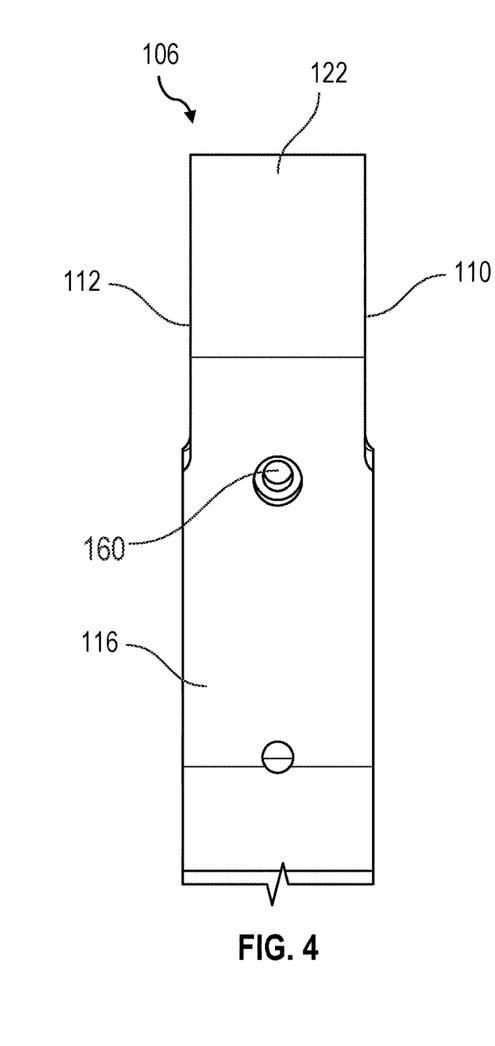
FIG. 4 is an aft end view of the portion of the armrest support of FIG. 3.

The armrest support 106 may be various support or frame members suitable for supporting the armrest 104. In the embodiment illustrated, the armrest support 106 is a spreader of an aircraft passenger seat. As illustrated in FIGS. 2 and 3, for example, the armrest support 106 includes a first side 110 and a second side 112. A distance from the first side 110 to the second side 112 may be a thickness of the armrest support 106. The armrest support 106 may further include a forward end 114 and an aft end 116.

In certain embodiments, the armrest support 106 defines an aperture 118 having an aperture wall 120. The aperture 118 may be defined proximate to an end 122 of the armrest support 106; however, in other embodiments, the aperture 118 may be defined in other portions of the armrest support 106 as desired.

As illustrated in FIG. 3, for example, the aperture wall 120 includes a pivot-limiting feature 124. As discussed in detail below, the pivot-limiting feature 124 may be complimentary to a pivot-limiting feature 144 of the armrest pivot 108 for controlling rotation of the armrest 104. In the embodiment illustrated, the pivot-limiting feature 124 is a ridge 126 that extends inwards from the aperture wall 120, and the ridge 126 includes a first end 128 and a second end 130. A distance from the first end 128 to the second end 130 is a length of the ridge 126, and in certain embodiments the length may be adjusted to control the range of rotation of the armrest 104. The ridge 126 may have a ridge surface 152, and in certain embodiments, the ridge surface 152 optionally may be non-linear. In the embodiment illustrate, the ridge 126 extends from the first side 110 to the second side 112; however, in other embodiments, the ridge 126 need not extend from the first side 110 to the second side 112, and the ridge 126 may extend partially between the sides 110, 112. Moreover, the particular location of the ridge 126 along the aperture wall 120 and relative to the forward end 114 and the aft end 116 should not be considered limiting, as in various embodiments, the ridge 126 as the pivot-limiting feature 124 may be provided at various locations long the aperture wall 120 as desired.

While the pivot-limiting feature 124 is illustrated as the ridge 126, as mentioned, in other embodiments, may be other features or components for controlling a range of rotation of the armrest 104 as desired. As non-limiting examples, the pivot-limiting feature 124 may be one or more grooves recessed into the aperture wall 120 and/or may be a ridge or stopper having a different profile. In the embodiment illustrated, the pivot-limiting feature 124 is monolithic or integrally formed with the armrest support 106, although it need not be in other examples.

Figure 5:
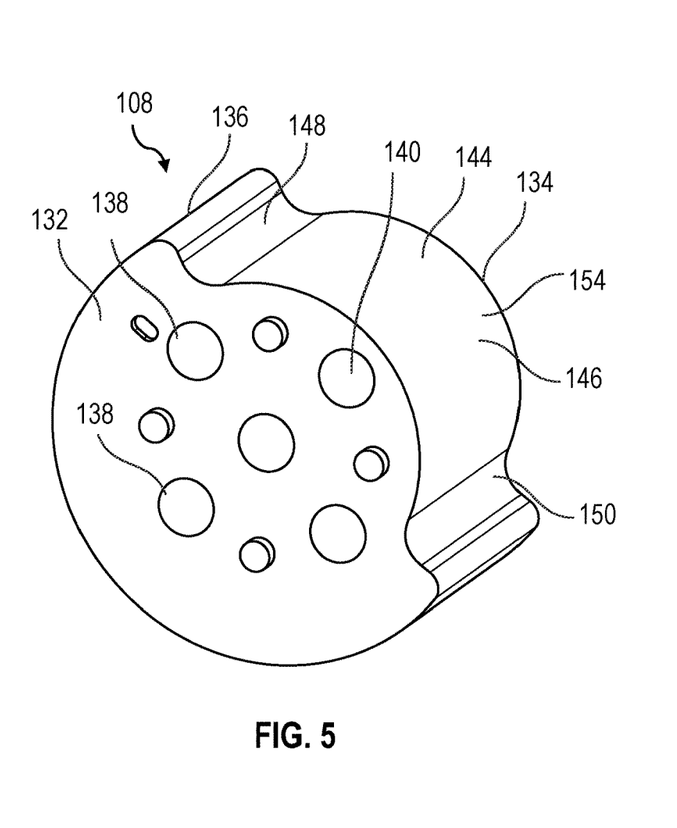
FIG. 5 is a perspective view of an armrest pivot of the armrest pivot assembly of FIG. 1.
Figure 6:
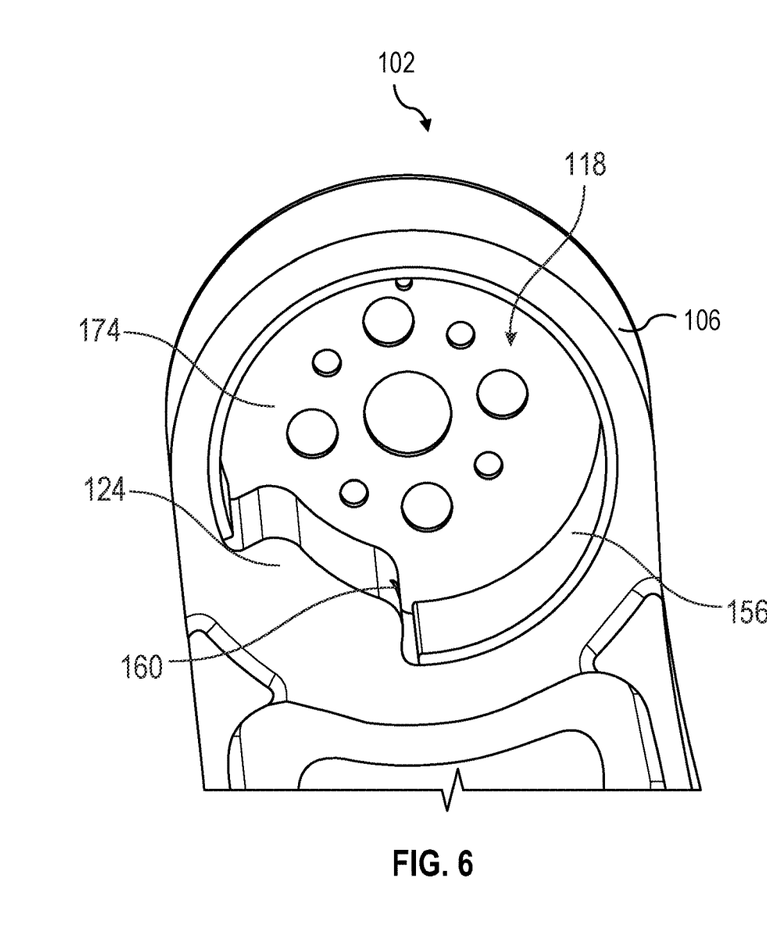
FIG. 6 is a perspective view of the armrest pivot assembly of FIG. 1 partially assembled.

As best illustrated in FIG. 5, the armrest pivot 108 includes a first side 132, a second side 134, and a perimeter wall 136. In certain embodiments, a distance from the first side 132 to the second side 134 of the armrest pivot 108 optionally is the same as the distance from the first side 110 to the second side 112 of the armrest support 106 at the aperture 118. In certain embodiments, the armrest pivot 108 includes one or more support features 138 for facilitating coupling of the armrest 104 with the armrest pivot 108. In the embodiment illustrated, the support features 138 include a plurality of apertures 140 extending through the armrest pivot 108 for receiving mechanical fasteners 142 such as pins, bolts, screws, etc. However, the number, type, and location of support features 138 should not be considered limiting, and in other embodiments, other devices, features, or mechanisms may be used to couple the armrest 104 with the armrest pivot 108. As a non-limiting example, a snap-fit connection, friction fit connection, clips, hooks, combinations thereof, and/or other types of support features suitable for attachment of the armrest 104 with the armrest pivot 108 may be utilized.

The profile and shape of the perimeter wall 136 may be complimentary to that of the aperture wall 120 such that the armrest pivot 108 may rotate relative to the armrest support 106 while positioned within the aperture 118. As illustrated in FIG. 5, in certain embodiments, the armrest pivot 108 includes the pivot-limiting feature 144 that is complimentary to the pivot-limiting feature 124. As discussed in detail below, the pivot-limiting feature 144 may selectively engage the pivot-limiting feature 124 to control a range of rotation of the armrest 104 relative to the armrest support 106.

In the embodiment illustrated, the pivot-limiting feature 144 is a groove 146 that is recessed relative to the perimeter wall 136. The groove 146 has a first end 148, a second end 150 opposite from the first end 148, and a groove surface 154. A distance from the first end 148 to the second end 150 may be a length of the groove 146, and in certain embodiments the length of the groove 146 is greater than the length of the ridge 126. In certain embodiments, the groove surface 154 may be non-linear between the ends 148, 150 of the groove 146. In the embodiment illustrated, the groove 146 extends from the first side 132 to the second side 134, although it need not in other embodiments.

Figure 7:
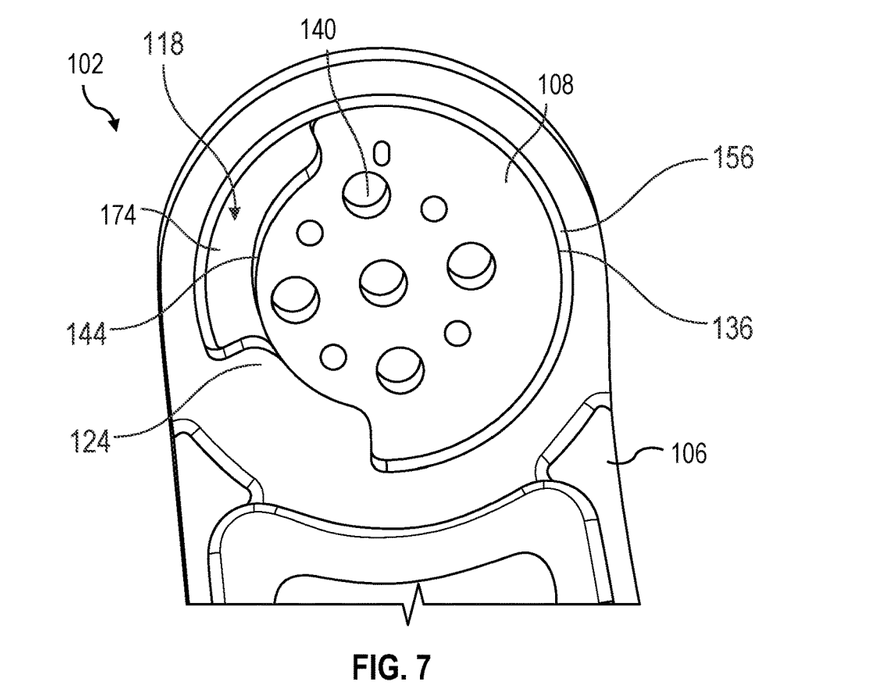
FIG. 7 is a side view of the armrest pivot assembly of FIG. 1 partially assembled.
Figure 8:
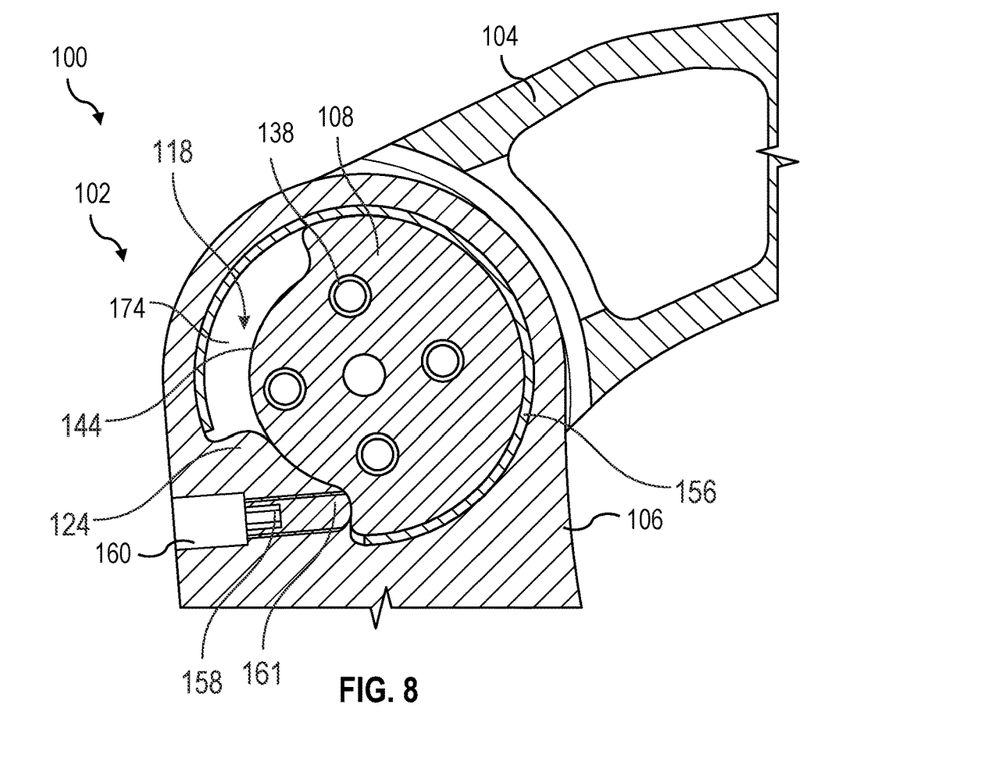
FIG. 8 is a sectional view of a portion of the armrest assembly of FIG. 1.

Referring to FIGS. 7 and 8, when the armrest pivot assembly 102 is assembled, the armrest pivot 108 is positioned within the aperture 118 of the armrest support 106. The armrest pivot 108 is rotatable within the aperture 118, and the pivot-limiting feature 144 selectively engages the pivot-limiting feature 124 at a first angular position (e.g., a minimum angle relative to a horizontal axis) and a second angular position (e.g., a maximum angle relative to the horizontal axis), thereby defining a range or rotation of the armrest pivot 108 relative to the armrest support 106. In some embodiments, in the first angular position, the first end 148 of the groove 146 engages the first end 128 of the ridge 126 and the second end 150 of the groove 146 is spaced apart from the second end 130 of the ridge 126. Conversely, in the second angular position, the second end 150 of the groove 146 engages the second end 130 of the ridge 126 and the first end 148 of the groove 146 is spaced apart from the first end 128 of the ridge 126.

Optionally, a friction member 156 may be provided within the aperture 118 between the perimeter wall 136 and the aperture wall 120. The friction member 156 may be various suitable devices or features for increasing friction between the armrest pivot 108 and the armrest support 106. In certain embodiments, the friction member 156 may allow for the armrest pivot 108 to remain at an intermediate angular position between the first angular position and the second angular position absent an external force. Additionally or alternatively, the friction member 156 may reduce wear or other problems that may otherwise be caused due to rotation of the armrest pivot 108 within the aperture 118. In other embodiments, and as illustrated in FIGS. 11-13, the armrest pivot assembly 102 need not include the friction member 156.

Optionally, and as best illustrated in FIG. 8, the armrest pivot assembly 102 includes an angle adjuster 158 for adjusting at least one of the first angular position or the second angular position. In the embodiment illustrated, the angle adjuster 158 is a set screw 161, which is positionable in an adjuster aperture 160 and threadably engaged with the adjuster aperture 160. The adjuster aperture 160 may extend through the armrest support 106 such that the set screw 161 may selectively extend into the aperture 118, such as (but not limited to) from the first end 128 or the second end 130 of the ridge 126. The angle adjuster 158 extending from the ridge 126 may cause the armrest pivot 108 to engage the angle adjuster 158 at a maximum or minimum position, thereby decreasing the range of rotation. As a non-limiting example, when the angle adjuster 158 does not extend into the aperture 118, the armrest pivot 108 may be rotatable over a range of angles of 0° to 90° relative to the horizontal axis, and when the angle adjuster 158 extends into the aperture 118, it changes the minimum angle to be 20°, and the range of motion is thus from 20° to 90°. The above example is for illustrative purposes and should not be considered limiting.

Figure 11:
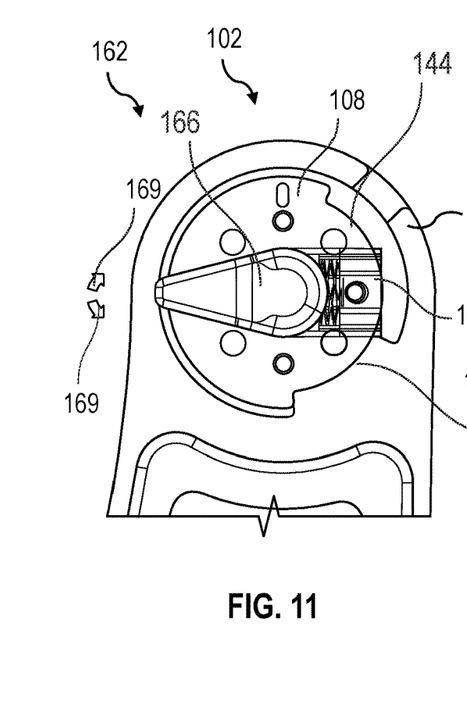
FIG. 11 is a side view of the armrest pivot assembly of FIG. 1 with a locking feature.
Figure 12:
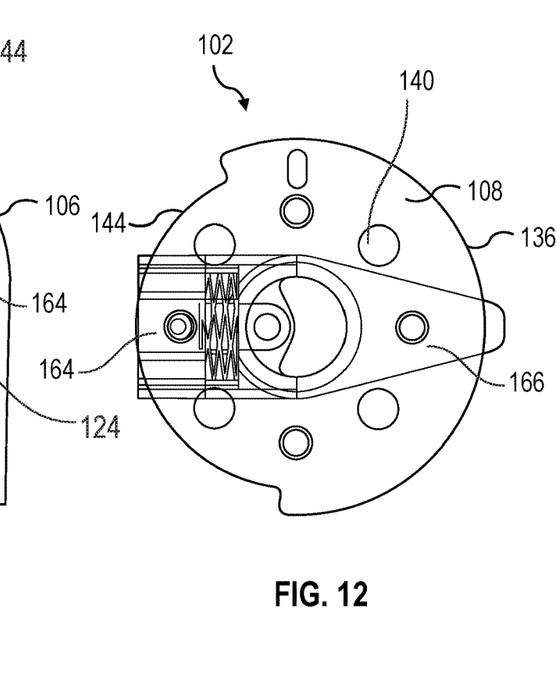
FIG. 12 is a side view of the armrest pivot of the armrest assembly with the locking feature of FIG. 11.
Figure 13:
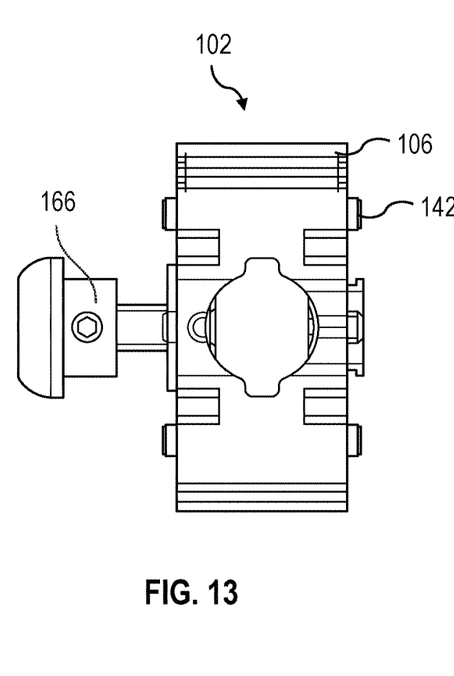
FIG. 13 is an end view of the armrest pivot assembly with the locking feature of FIG. 11.

Optionally, and as illustrated in FIGS. 11-12, a locking mechanism 162 may be provided with the armrest pivot 108 for selectively locking the armrest 104 at an angular position and/or to prevent rotation of the armrest pivot 108 as desired. In the embodiment illustrated, the locking mechanism 162 includes a plunger 164 and an actuator 166. The actuator 166 is a rotatable latch in the embodiment illustrated, and based on rotation of the latch, the plunger 164 is movable between a disengaged position (e.g., allowing normal rotation of the armrest pivot 108) and an engaged position (e.g., limiting rotation of the armrest pivot 108). FIGS. 11-13 illustrate the locking mechanism 162 in the disengaged position, with movement to the engaged position represented by arrows 169 in FIG. 11. In other embodiments, other types of locking mechanisms may be utilized as desired, and the locking mechanism 162 need not be the plunger and actuator illustrated.

Figure 9:
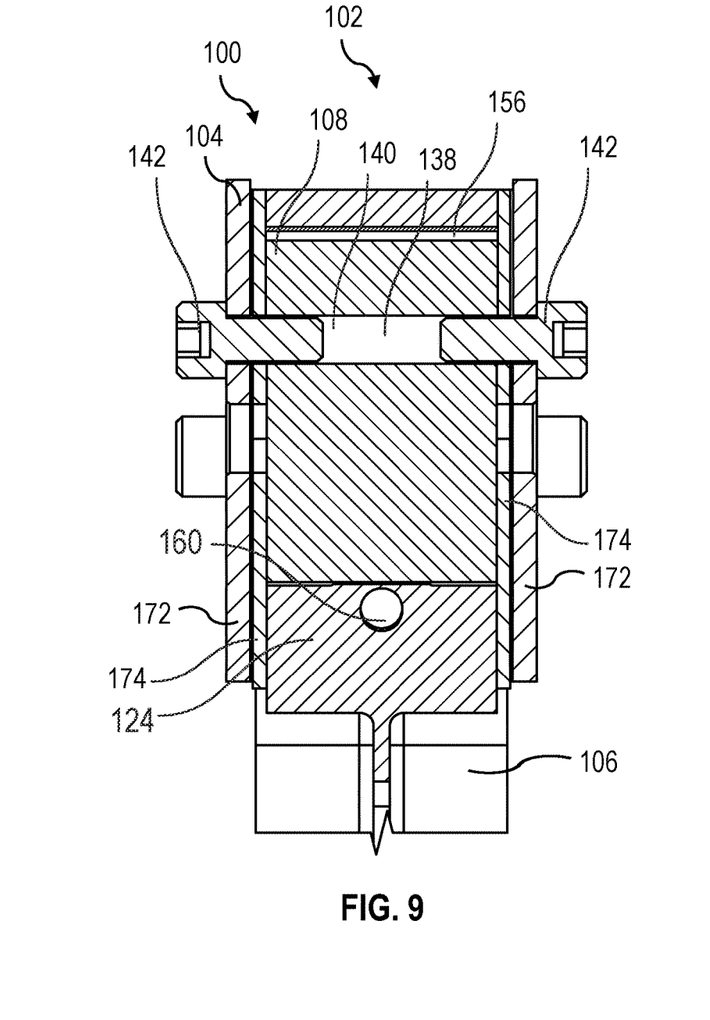
FIG. 9 is another sectional view of the armrest assembly of FIG. 1.
Figure 10:
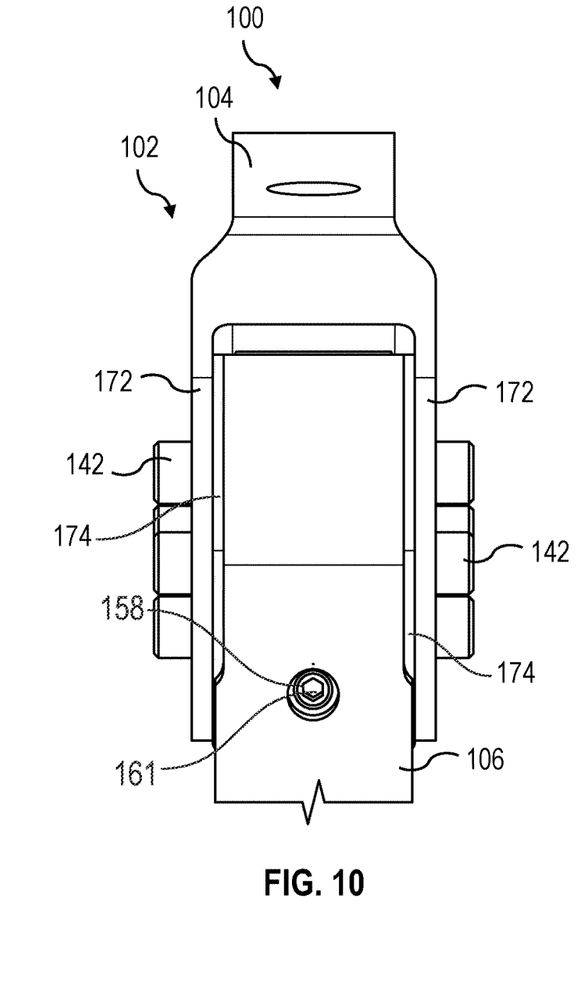
FIG. 10 is an aft end view of the armrest assembly of FIG. 1.

Referring to FIGS. 8-10, when the armrest 104 is assembled with the armrest pivot assembly 102, the extensions 172 of the armrest 104 may overlap the aperture 118 and the armrest pivot 108. In certain embodiments, friction members 174 are provided between the sides 110, 112 and the corresponding extensions 172. The friction members 174 may further facilitate positioning of the armrest 104 at an intermediate position and/or may reduce wear that would otherwise be caused by rotation of the armrest 104.

As illustrated in the figures, the armrest pivot assembly 102 supports the armrest 104 relative to a passenger seat while also defining a range of motion of the armrest 104 (e.g., between a stowed position and a deployed position). Compared to traditional armrests, the armrest pivot assembly 102 also eliminates the guide pin and the guide slot, thereby allowing for smaller pivot areas and/or an increased modularity and/or shaping of the pivot area as desired. The armrest pivot assembly 102 may further be lighter in weight and simpler compared to traditional armrests with guide pins and guide slots. Various other benefits and advantages may be realized with the systems and methods provided herein, and the aforementioned advantages should not be considered limiting.

In the following, further examples are described to facilitate the understanding of the invention:

Example A. An armrest pivot assembly for a passenger seat, the armrest pivot assembly comprising: an armrest support defining an aperture comprising an aperture wall, wherein the aperture wall comprises a first pivot-limiting feature; and an armrest pivot within the aperture of the armrest support and rotatable within the aperture relative to the armrest support, wherein the armrest pivot comprises a perimeter wall, wherein the perimeter wall comprises a second pivot-limiting feature, and wherein the first pivot-limiting feature and the second pivot-limiting feature define a range of rotation of the armrest pivot relative to the armrest support.

Example B. The armrest pivot assembly of any of the preceding or subsequent examples, wherein the first pivot-limiting feature comprises a ridge extending inwards from the aperture wall, and wherein the second pivot-limiting feature of the armrest pivot comprises a recessed surface recessed into the armrest pivot relative to the perimeter wall.

Example C. The armrest pivot assembly of any of the preceding or subsequent examples, wherein the ridge is elongated and comprises a first end and a second end within the aperture, wherein the recessed surface is elongated and comprises a first end and a second end, wherein the first end of the ridge is configured to engage the first end of the recessed surface when the armrest pivot is at first angular position, and wherein the second end of the ridge is configured to engage the second end of the recessed surface when the armrest pivot is at a second angular position.

Example D. The armrest pivot assembly of any of the preceding or subsequent examples, wherein a length of the ridge is less than a length of the recessed surface.

Example E. The armrest pivot assembly of any of the preceding or subsequent examples, wherein the recessed surface comprises a non-linear curvature, and wherein the ridge comprises an innermost surface comprising a non-linear curvature.

Example F. The armrest pivot assembly of any of the preceding or subsequent examples, wherein the armrest pivot is rotatable between a first angular position and a second angular position, wherein the first pivot-limiting feature further comprises an angle adjuster configured to adjust at least one of the first angular position or the second angular position.

Example G. The armrest pivot assembly of any of the preceding or subsequent examples, wherein the angle adjuster comprises a set screw.

Example H. The armrest pivot assembly of any of the preceding or subsequent examples, wherein the armrest pivot comprises at least one support location for an armrest.

Example I. The armrest pivot assembly of any of the preceding or subsequent examples, further comprising a friction device within the aperture between the perimeter wall of the armrest pivot and the aperture wall of the aperture.

Example J. The armrest pivot assembly of any of the preceding or subsequent examples, wherein the armrest pivot further comprises a locking mechanism configured to lock the armrest pivot at an angular position relative to the armrest support.

Example K. The armrest pivot assembly of any of the preceding or subsequent examples, wherein a thickness of a portion of the armrest support defining the aperture is a same as a thickness of the armrest pivot.

Example L. The armrest pivot assembly of any of the preceding or subsequent examples, wherein the armrest pivot comprises a first end and a second end, wherein the perimeter wall extends from the first end to the second end, and wherein the second pivot-limiting feature comprises a recessed surface that is recessed relative to the perimeter wall and extends from the first end to the second end.

Example M. A passenger seat comprising the armrest pivot assembly of any of the preceding or subsequent examples and an armrest coupled to the armrest pivot.

Example N. The passenger seat of any of the preceding or subsequent examples, wherein the armrest comprises an end, the end comprising a first extension and a second extension, wherein the first extension and the second extension overlap the aperture and armrest pivot of the armrest pivot assembly.

Example O. The passenger seat of any of the preceding or subsequent examples, further comprising a first friction device between the first extension of the armrest and the armrest pivot assembly and a second friction device between the second extension of the armrest and the armrest pivot assembly.

Example P. An armrest pivot for a passenger seat, the armrest pivot comprising: a first end; a second end; a perimeter wall between the first end and the second end, the perimeter wall extending from the first end to the second end, wherein a portion of the perimeter wall between the first end and the second end comprises a pivot-limiting feature configured to engage a complimentary pivot-limiting feature within an aperture of an armrest support.

Example Q. An armrest assembly comprising the armrest pivot of any of the preceding or subsequent examples and the armrest support comprising the aperture with the complimentary pivot-limiting feature, wherein the armrest pivot is positioned within the aperture and rotatable relative to the armrest support.

Example R. The armrest assembly of any of the preceding or subsequent examples, further comprising an armrest, the armrest comprising a first extension and a second extension, wherein the first extension is coupled to the first end of the armrest pivot and the second extension is coupled to the second end of the armrest pivot.

Example S. An armrest pivot assembly comprising: an armrest support comprising an aperture and a first pivot-limiting feature within the aperture; and an armrest pivot within the aperture of the armrest support and rotatable within the aperture relative to the armrest support, wherein the armrest pivot comprises a second pivot-limiting feature within the aperture defined by the armrest support, wherein the second pivot-limiting feature is configured to selectively engage the first pivot-limiting feature.

Example T. The armrest pivot assembly of any of the preceding or subsequent examples, wherein the second pivot-limiting feature is configured to engage the first pivot-limiting feature when the armrest pivot is rotated to a first angular position or a second angular position relative to the armrest support, and wherein the armrest pivot assembly further comprises an angle adjuster at least partially within the aperture and configured to adjust at least one of the first angular position or the second angular position.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Directional references such as "up," "down," "top," "bottom," "left," "right," "forward," and "aft," among others, are intended to refer to the orientation as illustrated and described in the figure (or figures) to which the components and directions are referencing. In the figures and the description, like numerals are intended to represent like elements. As used herein, the meaning of "a," "an," and "the" includes singular and plural references unless the context clearly dictates otherwise.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. An armrest pivot assembly for a passenger seat, the armrest pivot assembly comprising:
   an armrest support defining an aperture comprising an aperture wall, wherein the aperture wall comprises a first pivot-limiting feature;
   an armrest coupled to an armrest pivot; and
   the armrest pivot within the aperture of the armrest support, the armrest pivot having a center axis extending through the aperture, wherein the armrest pivot is rotatable relative to the armrest support within the aperture about the center axis, wherein the armrest pivot comprises a perimeter wall, wherein the armrest is rotatable relative to the armrest support about the center axis, wherein the perimeter wall comprises a second pivot-limiting feature, wherein the first pivot-limiting feature and the second pivot-limiting feature define a range of rotation of the armrest pivot relative to the armrest support, wherein the armrest comprises an end, the end comprising a first extension and a second extension, and wherein the first extension and the second extension of the armrest overlap the aperture and the armrest pivot.

2. The armrest pivot assembly of claim 1, wherein the first pivot-limiting feature comprises a ridge extending inwards from the aperture wall, and wherein the second pivot-limiting feature of the armrest pivot comprises a recessed surface recessed into the armrest pivot relative to the perimeter wall.

3. The armrest pivot assembly of claim 2, wherein the ridge is elongated and comprises a first end and a second end within the aperture, wherein the recessed surface is elongated and comprises a first end and a second end, wherein the first end of the ridge is configured to engage the first end of the recessed surface when the armrest pivot is at first angular position, and wherein the second end of the ridge is configured to engage the second end of the recessed surface when the armrest pivot is at a second angular position.

4. The armrest pivot assembly of claim 3, wherein a length of the ridge is less than a length of the recessed surface.

5. The armrest pivot assembly of claim 2, wherein the recessed surface comprises a non-linear curvature, and wherein the ridge comprises an innermost surface comprising a non-linear curvature.

6. The armrest pivot assembly of claim 1, wherein the armrest pivot is rotatable between a first angular position and a second angular position, wherein the first pivot-limiting feature further comprises an angle adjuster configured to adjust at least one of the first angular position or the second angular position.

7. The armrest pivot assembly of claim 6, wherein the angle adjuster comprises a set screw.

8. The armrest pivot assembly of claim 1, wherein the armrest pivot comprises at least one support location for the armrest.

9. The armrest pivot assembly of claim 1, further comprising a friction device within the aperture between the perimeter wall of the armrest pivot and the aperture wall of the aperture.

10. The armrest pivot assembly of claim 1, wherein the armrest pivot further comprises a locking mechanism configured to lock the armrest pivot at an angular position relative to the armrest support.

11. The armrest pivot assembly of claim 1, wherein a thickness of a portion of the armrest support defining the aperture is a same as a thickness of the armrest pivot.

12. The armrest pivot assembly of claim 1, wherein the armrest pivot comprises a first end and a second end, wherein the perimeter wall extends from the first end to the second end, and wherein the second pivot-limiting feature comprises a recessed surface that is recessed relative to the perimeter wall and extends from the first end to the second end.

13. The passenger seat of claim 1, further comprising a first friction device between the first extension of the armrest and the armrest pivot assembly and a second friction device between the second extension of the armrest and the armrest pivot assembly.

14. An armrest assembly for a passenger seat, the armrest assembly comprising:
   an armrest support comprising an aperture and a first pivot-limiting feature within the aperture;
   an armrest coupled to an armrest pivot; and
   the armrest pivot comprising:
     a first side;
     a second side;
     a perimeter wall between the first side and the second side, the perimeter wall extending from the first side to the second side,
     wherein the armrest pivot is positioned within the aperture and is rotatable relative to the armrest support about a center axis of the armrest pivot extending through the aperture,
     wherein the armrest is rotatable relative to the armrest support about the center axis,
     wherein a portion of the perimeter wall between the first side to the second side comprises a second pivot-limiting feature configured to engage the first pivot-limiting feature based on rotation of the armrest pivot about the center axis,
     wherein the armrest comprises an end, the end comprising a first extension and a second extension, and wherein the first extension and the second extension of the armrest overlap the aperture and the armrest pivot.

15. The armrest assembly of claim 14, further comprising the armrest, the armrest comprising a first extension and a second extension, wherein the first extension is coupled to the first side of the armrest pivot and the second extension is coupled to the second side of the armrest pivot.

16. An armrest pivot assembly comprising:
an armrest support comprising an aperture and a first pivot-limiting feature within the aperture;
an armrest coupled to an armrest pivot; and
the armrest pivot within the aperture of the armrest support and rotatable within the aperture relative to the armrest support about a center axis of the armrest pivot extending through the aperture, wherein the armrest is rotatable relative to the armrest support about the center axis, wherein the armrest pivot comprises a second pivot-limiting feature, the second pivot-limiting feature within the aperture defined by the armrest support, wherein the second pivot-limiting feature is configured to selectively engage the first pivot-limiting feature based on rotation of the armrest pivot about the center axis, wherein the armrest comprises an end, the end comprising a first extension and a second extension, and wherein the first extension and the second extension of the armrest overlap the aperture and the armrest pivot.

17. The armrest pivot assembly of claim 16, wherein the second pivot-limiting feature is configured to engage the first pivot-limiting feature when the armrest pivot is rotated to a first angular position or a second angular position relative to the armrest support, and wherein the armrest pivot assembly further comprises an angle adjuster at least partially within the aperture and configured to adjust at least one of the first angular position or the second angular position.

* * * * *